United States Patent
Suzuki et al.

(10) Patent No.: US 9,665,232 B2
(45) Date of Patent: May 30, 2017

(54) INFORMATION-PROCESSING DEVICE, STORAGE MEDIUM, INFORMATION-PROCESSING METHOD, AND INFORMATION-PROCESSING SYSTEM FOR ENLARGING OR REDUCING AN IMAGE DISPLAYED ON A DISPLAY DEVICE

(71) Applicant: NINTENDO CO., LTD., Kyoto (JP)

(72) Inventors: Ichiro Suzuki, Kyoto (JP); Seita Inoue, Kyoto (JP); Ryota Oiwa, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 277 days.

(21) Appl. No.: 13/749,102

(22) Filed: Jan. 24, 2013

(65) Prior Publication Data
US 2014/0111551 A1 Apr. 24, 2014

(30) Foreign Application Priority Data
Oct. 23, 2012 (JP) .................. 2012-234079

(51) Int. Cl.
*G09G 5/02* (2006.01)
*G06F 3/048* (2013.01)
(Continued)

(52) U.S. Cl.
CPC ............ *G06F 3/048* (2013.01); *G06F 3/013* (2013.01); *G06F 3/0484* (2013.01); *G06F 3/0485* (2013.01); *G06F 2203/04806* (2013.01)

(58) Field of Classification Search
CPC ........ G06F 3/0485; G06F 3/0484; G06F 3/13; G06F 3/048; G06F 2203/04806
(Continued)

(56) References Cited

U.S. PATENT DOCUMENTS 5,742,924 A * 4/1998 Nakayama ................ 701/458
5,760,783 A * 6/1998 Migdal .................... 345/587
(Continued)

FOREIGN PATENT DOCUMENTS

| JP | 2008-288767 | 11/2008 |
| JP | 2012-150558 | 8/2012 |
| WO | WO 2012/001637 A1 | 1/2012 |

OTHER PUBLICATIONS

Office Action in corresponding Japanese Application No. 2012-234079 dated Jul. 12, 2016.

*Primary Examiner* — Robert Craddock
(74) *Attorney, Agent, or Firm* — Nixon & Vanderhye, P.C.

(57) ABSTRACT

An information-processing device includes: an enlargement/reduction instruction receiving unit configured to receive an enlargement/reduction instruction to enlarge or reduce a display region that is at least a portion of a predetermined region; a first control unit configured to, when enlarging or reducing the display region in accordance with the enlargement/reduction instruction, compute, based on a relationship between a position of a point of regard of the display region within the predetermined region and a position of a reference point of the predetermined region, a position where the point of regard is to be located within the predetermined region after the enlargement or reduction; and a second control unit configured to enlarge or reduce the display region, based on the enlargement/reduction instruction.

16 Claims, 7 Drawing Sheets

(51) Int. Cl.
 *G06F 3/01* (2006.01)
 *G06F 3/0484* (2013.01)
 *G06F 3/0485* (2013.01)

(58) Field of Classification Search
 USPC .......................................................... 345/660
 See application file for complete search history.

(56) References Cited

U.S. PATENT DOCUMENTS

2006/0026521 A1* 2/2006 Hotelling .............. G06F 3/0418
 715/702
2008/0285800 A1 11/2008 Miyake et al.
2009/0066730 A1* 3/2009 Mikawa ........................ 345/661
2012/0182324 A1 7/2012 Yano

* cited by examiner

INFORMATION-PROCESSING DEVICE, STORAGE MEDIUM, INFORMATION-PROCESSING METHOD, AND INFORMATION-PROCESSING SYSTEM FOR ENLARGING OR REDUCING AN IMAGE DISPLAYED ON A DISPLAY DEVICE

CROSS REFERENCE TO RELATED APPLICATIONS

This application is based on and claims priorities under 35 USC 119 from Japanese patent application No. 2012-234079, which was filed on Oct. 23, 2012.

FIELD

This application relates to user interfaces.

BACKGROUND AND SUMMARY

Technology for displaying an image that scrolls an object is known.

The technology herein provides the user with a more natural operational feel.

There is provided an information-processing device including: an enlargement/reduction instruction receiving unit configured to receive an enlargement/reduction instruction to enlarge or reduce a display region that is at least a portion of a predetermined region; a first control unit configured to, when enlarging or reducing the display region in accordance with the enlargement/reduction instruction, compute, based on a relationship between a position of a point of regard of the display region within the predetermined region and a position of a reference point of the predetermined region, a position where the point of regard is to be located within the predetermined region after the enlargement or reduction; and a second control unit configured to enlarge or reduce the display region, based on the enlargement/reduction instruction.

BRIEF DESCRIPTION OF THE DRAWINGS

Exemplary embodiments will be described with reference to the following drawings, wherein.

DETAILED DESCRIPTION OF NON-LIMITING EXEMPLARY EMBODIMENTS

1. Overview

Figure 1:
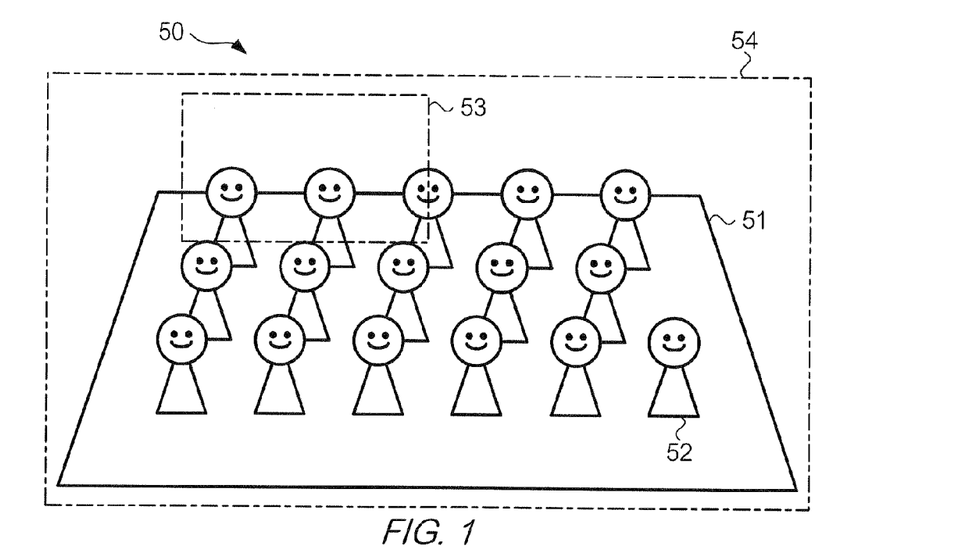
FIG. 1 shows an example of virtual space 50 according to an embodiment.

FIG. 1 illustrates virtual space 50 in the present embodiment. In this example, virtual space 50 is a three-dimensional virtual space. Virtual space 50 has field 51 and objects 52. Field 51 is an image representing a field in which the objects are disposed, and is pasted to a predetermined plane in virtual space. Objects 52 are virtual objects disposed in virtual space, and include at least one of objects representing icons, characters (people, animals, monsters, etc.), buildings (houses, towers, castles, etc.), natural objects (mountains, rivers, trees, rocks, etc.), structures that are not fixed to the field (cars, blocks, etc.), and the like. In the example in FIG. 1, a plurality of objects 52 each representing a character are disposed.

A virtual camera (not shown) is provided in virtual space 50, and an image virtually captured with this virtual camera is displayed on a display device. Region 53 represents a region captured by this virtual camera, that is, a region displayed on the display device. Region 53 is moved, enlarged or reduced according to an operation input from a user. That is, the image displayed on the display device is scrolled, enlarged or reduced according to an operation input. Free movement range 54 is set for region 53. Region 53 moves freely according to operation of the virtual camera when inside free movement range 54, but outside of free movement range 54, movement of region 53 is restricted as compared to when inside free movement range 54. Note that, in this example, region 53 is not entirely prevented from moving outside of free movement range 54. Depending on restrictions that are set, at least a portion of region 53 may move outside of free movement range 54. Also, free movement range 54 has a three-dimensional shape but is shown two-dimensionally in simplified form in FIG. 1.

A user may use a system that provides such a virtual space 50 as follows, for example. The user moves region 53, in order to search for a desired object from among the plurality of objects 52. When the desired object is found, the user enlarges the image in order to check the detail of that object.

Figure 2A:
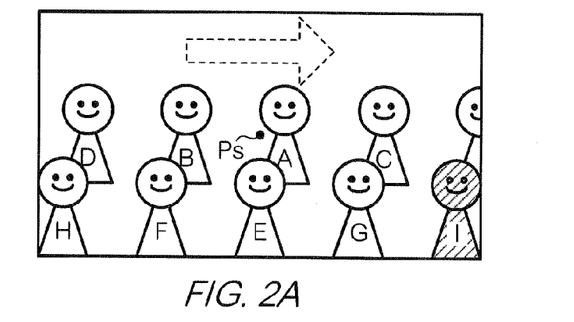
FIGS. 2A and 2B show examples of scrolling and enlargement of an image in a comparative example.
Figure 2B:
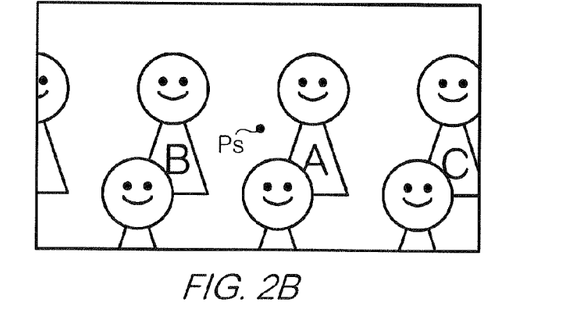

FIGS. 2A and 2B illustrate scrolling and enlargement of an image in a comparative example. The user who moves region 53, having found the desired object (e.g., hatched object) on the screen (FIG. 2A; arrow shows movement direction of region 53), instructs enlargement of the image (namely, reduction of region 53). The image is enlarged around a set reference point. In this example, the reference point used in enlargement is the central point of region 53 (hereinafter, the central point of region 53 will be called the "point of regard Ps"). In the comparative example, the position of the point of regard in virtual space 50 does not change before and after enlargement. Here, depending on the positional relationship between the point of regard and the object when enlargement is instructed, the desired object may move outside of region 53 after enlargement (FIG. 2B). In this case, the user has to search for the desired object and move region 53 again.

Figure 3A:
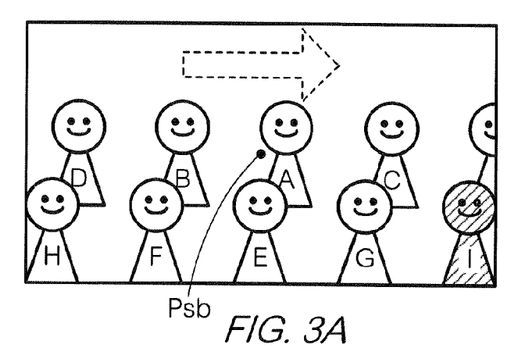
FIGS. 3A and 3B show examples of scrolling and enlargement of an image in the embodiment.
Figure 3B:
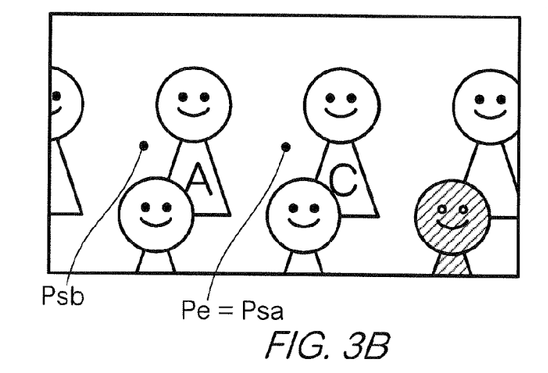

FIGS. 3A and 3B illustrates scrolling and enlargement of an image in the present embodiment. The user who moves region 53, having found the desired object on the screen (FIG. 3A), instructs enlargement of the image (i.e., reduction of region 53). Note that in following description, when distinguishing between the point of regard before enlargement and the point of regard after enlargement, the point of regard before enlargement will be called point of regard Psb, and the point of regard after enlargement will be called point of regard Psa. In this example, reference point Pe used in enlargement shifts from point of regard Psb of region 53 (FIG. 3B). Reference point Pe used in enlargement is point of regard Psa in the image after enlargement. In other words, point of regard Ps changes before and after enlargement. This shift is determined according to the positional relationship between reference point Po of virtual space 50 (e.g., central point Pc of virtual space 50) and point of regard Psb of region 53. Specifically, this shift has the same orientation as a vector from reference point Po to point of regard Psb. According to this example, the probability that the desired object will be displayed on the screen after enlargement can be increased, as compared to the case where the point of regard does not change before and after enlargement. Hereinafter, the configuration and operations of a device that provides such a user interface will be described.

2. Configuration

Figure 4:
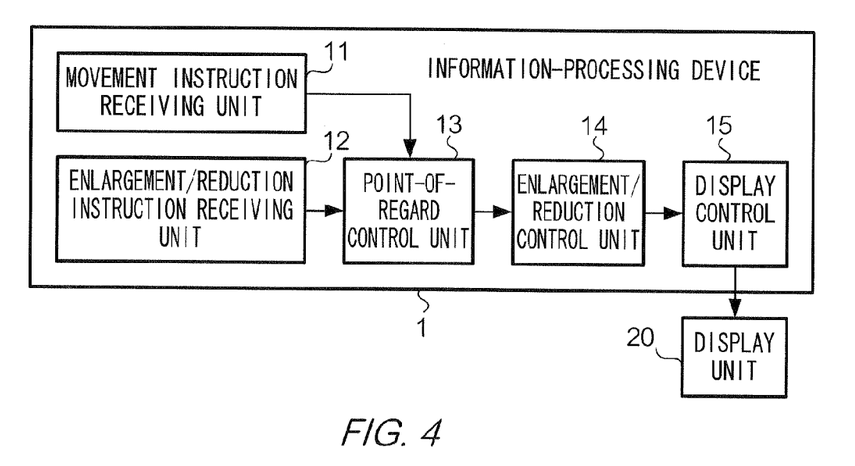
FIG. 4 shows an example of a functional configuration of information-processing device 1 according to one embodiment.

FIG. 4 shows a functional configuration of information-processing device 1 according to one embodiment. Information-processing device 1 has movement instruction receiving unit 11, enlargement/reduction instruction receiving unit 12, point-of-regard control unit 13, enlargement/reduction control unit 14, and display control unit 15. Movement instruction receiving unit 11 receives a movement instruction to move region 53 which is at least a portion of a predetermined region (in this example, virtual space 50). Enlargement/reduction instruction receiving unit 12 receives an instruction to enlarge or reduce region 53 (hereinafter, this instruction is referred to simply as an "enlargement/reduction instruction"). Point-of-regard control unit 13, when enlarging or reducing region 53 in accordance with an enlargement/reduction instruction, computes the position of the point of regard in virtual space 50 after enlargement or reduction, based on the relationship between the position of the point of regard before enlargement or reduction of region 53 in virtual space 50 and the position of a reference point of virtual space 50. Note that, in this example, the reference point of virtual space 50 is the central point of virtual space 50. Enlargement/reduction control unit 14 enlarges or reduces region 53, based on the enlargement/reduction instruction. Display control unit 15 displays an image of region 53 in virtual space 50 on display unit 20. Display unit 20, in this example, is a function provided by an external device outside of information-processing device 1, and displays at least one of characters and images.

Figure 5:
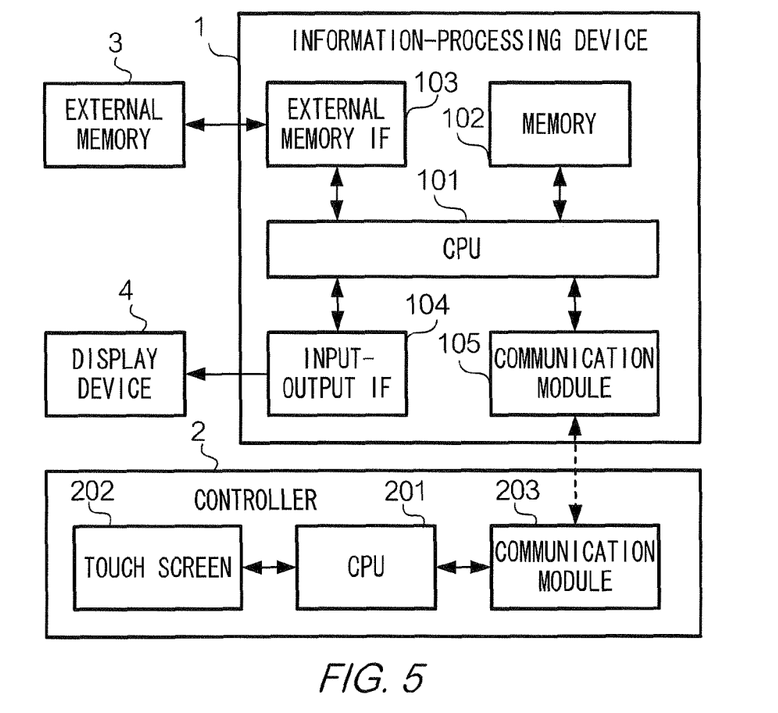
FIG. 5 shows an example of a hardware configuration of information-processing device 1.

FIG. 5 shows a hardware configuration of information-processing device 1. In this example, information-processing device 1 is a game device for executing a video game. Information-processing device 1 is a computer device having CPU 101, memory 102, external memory IF 103, input/output IF 104, and communication module 105. Controller 2 is used for operating information-processing device 1. Also, information-processing device 1 is connected to display device 4. Display device 4 is a device that displays information including at least one of images and characters, and has a display (liquid crystal panel, organic Electro-Luminescence (EL) panel, etc.) and a drive circuit. In this example, information-processing device 1 is a so-called console-type game device, and does not incorporate display device 4. Display device 4 is an external device, such as a television receiver, for example. Note that information-processing device 1 may incorporate display device 4.

CPU 101 is a device that controls the constituent elements of information-processing device 1, and performs various arithmetic operations. Memory 102 is a storage device that stores programs and data, and has a RAM (Random Access Memory) and a ROM (Read Only Memory), for example. External memory IF 103 is an interface that performs writing and reading of programs and data to and from external memory 3 (e.g., optical disk, magnetic disk or semiconductor memory) that stores programs (e.g., game programs) and data. Input/output IF 104 is an interface that mediates signals to and from an input/output device (in this example, display device 4). Communication module 105 is a device that communicates with controller 2, and has an antenna and an amplifier, for example. By executing a program (e.g., game program) stored in external memory 3 or memory 102, a function (e.g., video game) relating to that program is realized in information-processing device 1.

Controller 2 is a device that inputs instructions to information-processing device 1, and, in this example, has a further function of displaying an image in accordance with a signal transmitted from information-processing device 1. Controller 2 has CPU 201, touch screen 202, and communication module 203. CPU 201 is a device that controls the constituent elements of controller 2, and performs various arithmetic operations using a memory (not shown). Touch screen 202 is a device that is provided with both a function of displaying information and a function of inputting instructions, and has a display, a drive circuit, and a touch sensor provided on the surface of the display, for example. Communication module 203 is a device that communicates with information-processing device 1, and has an antenna and an amplifier, for example.

In this example, a function of displaying an image of region 53 in virtual space 50 on at least one of display device 4 and touch screen 202 is provided, by a program (game program, system software, or a combination thereof) stored in external memory 3 or memory 102. Also, region 53 moves within virtual space 50, according to an operation input via controller 2. CPU 101 that executes this program is an example of movement instruction receiving unit 11, enlargement/reduction instruction receiving unit 12, point-of-regard control unit 13, enlargement/reduction control unit 14, and display control unit 15. At least one of display device 4 and touch screen 202 is an example of display unit 20.

3. Operations

Figure 6:
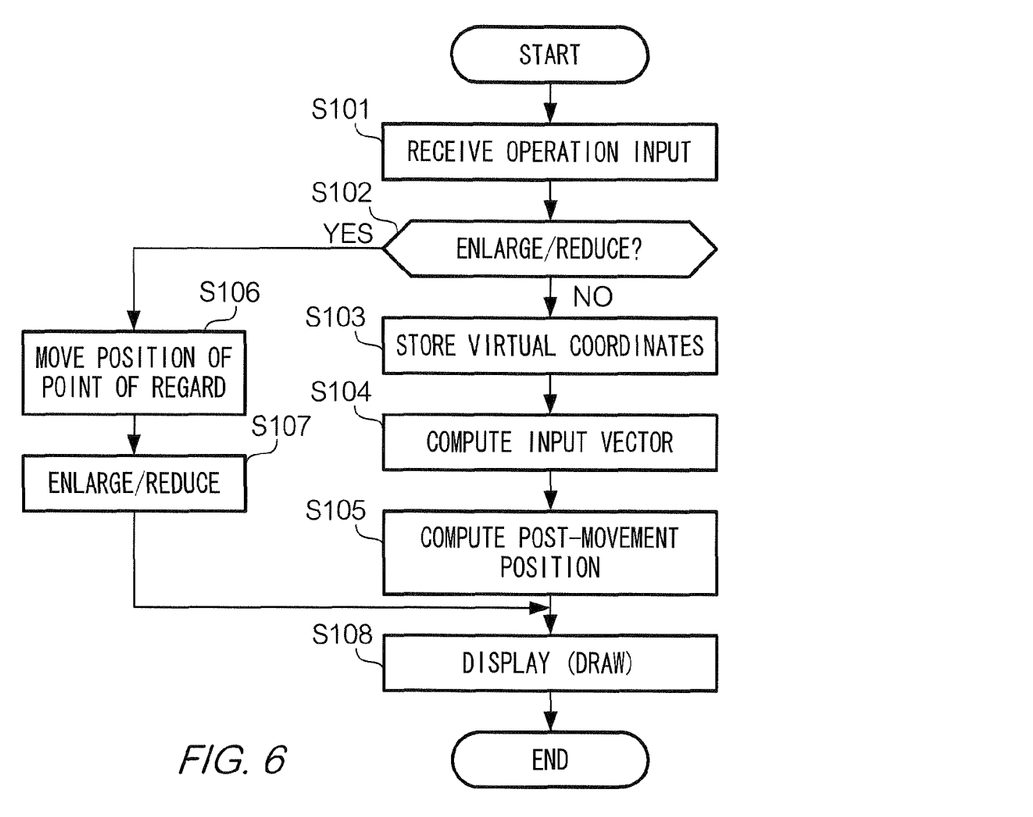
FIG. 6 shows an example of a flowchart illustrating operations of information-processing device 1.

FIG. 6 is a flowchart showing operations of information-processing device 1. Before starting the flowchart of FIG. 6, a program for displaying an image of region 53 in virtual space 50 is executed. Here, an example will be described in which an image of region 53 is displayed on touch screen 202, and an instruction that depends on an operation input from a user on touch screen 202 is input to information-processing device 1. Also, in this example, the processing of FIG. 6 is repeatedly executed in a predetermined cycle (e.g., 16.7 ms which is equivalent to 60 Hz). The unit period of this processing is a "frame".

Operations on touch screen 202 include "drag" and "flick". A drag operation involves tracing a finger over touch screen 202; that is, moving the touched position while continuing to touch the screen. A flick operation involves quickly swiping touch screen 202 with a finger; that is, removing the finger from touch screen 202 after performing a drag operation at a faster speed than a predetermined reference value. The movement speed of region 53 is determined according to these operations, and an image of region 53 that moves according to the determined movement speed is displayed.

Figure 7:
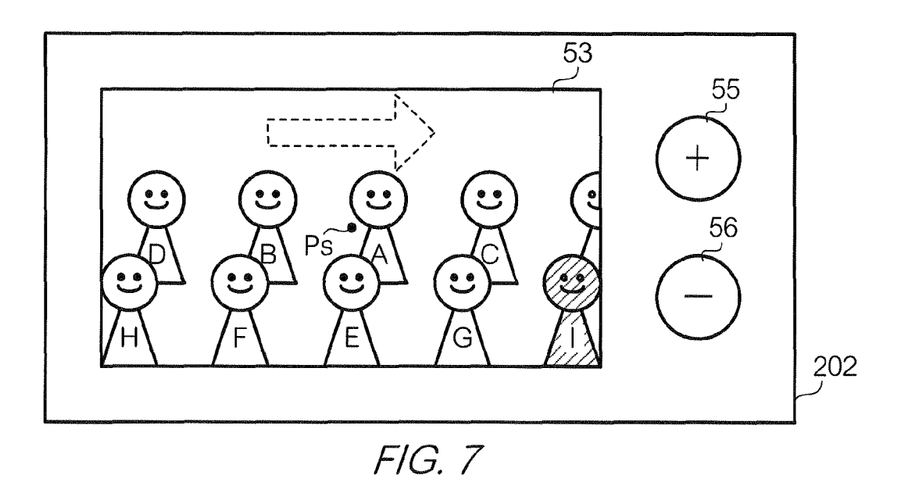
FIG. 7 shows an example of an image displayed on touch screen 202.

FIG. 7 illustrates an image displayed on touch screen 202. In this example, button 55 for instructing enlargement of the image and button 56 for instructing reduction of the image are displayed on touch screen 202, in addition to the image of region 53. When the user touches a position corresponding to button 55 on touch screen 202, an image enlargement instruction is input to information-processing device 1. When the user touches a position corresponding to button 56 on touch screen 202, an image reduction instruction is input to information-processing device 1.

Referring again to FIG. 6, in step S101, CPU 101 receives an operation input. The details thereof are as follows. A signal that is transmitted from controller 2 and indicates an operation input from the user (hereinafter, "operation input signal") includes coordinates (hereinafter "real coordinates") of the position that was touched on touch screen 202. If touch screen 202 is not touched in the current frame, the operation input signal includes a null value. If the real coordinates are of a region corresponding to region 53, CPU 101 converts the real coordinates to coordinates showing a position in virtual space 50 (hereinafter referred to as "virtual Coordinates"; also, the point indicated by the virtual coordinates is called a "virtual point").

In step S102, CPU 101 judges whether the received operation input is an operation input that instructs enlargement or reduction of the image. This judgment is performed using the real coordinates indicated by the operation input signal. Specifically, in the case where the real coordinates indicate a position corresponding to button 55 or button 56, CPU 101 judges that the received operation input is an operation input that instructs enlargement or reduction of the image. In the case where the received operation input is judged to be an operation input that instructs enlargement or reduction of the image (S102: YES), CPU 101 shifts the processing to step S106. In the case where the received operation input is judged not to be an operation input that instructs enlargement or reduction of the image (S102: NO), CPU 101 shifts the processing to step S103.

In step S103, CPU 101 stores the virtual coordinates acquired in step S101 in memory 102. Memory 102 stores an operation input history, and, specifically, stores the virtual coordinates of each frame for a predetermined past period (e.g., from the frame in which a current drag or flick was started until the most recent frame) in sequence. CPU 101 writes the virtual coordinates of these frames into memory 102.

In step S104, CPU 101 computes an input vector. The input vector is a vector computed according to the operation input, and in this example is computed by the following equation (1).

$$I(j) = (1-k) \cdot I(j-1) + k \cdot i(j) \quad (1)$$

Here, I(j) represents the input vector of a jth frame. k represents a predetermined coefficient that satisfies 0<k<1. i(j) represents the operation input of the jth frame, that is, the vector from a virtual position of the (j−1)th frame to the virtual position of the jth frame.

Figure 8:
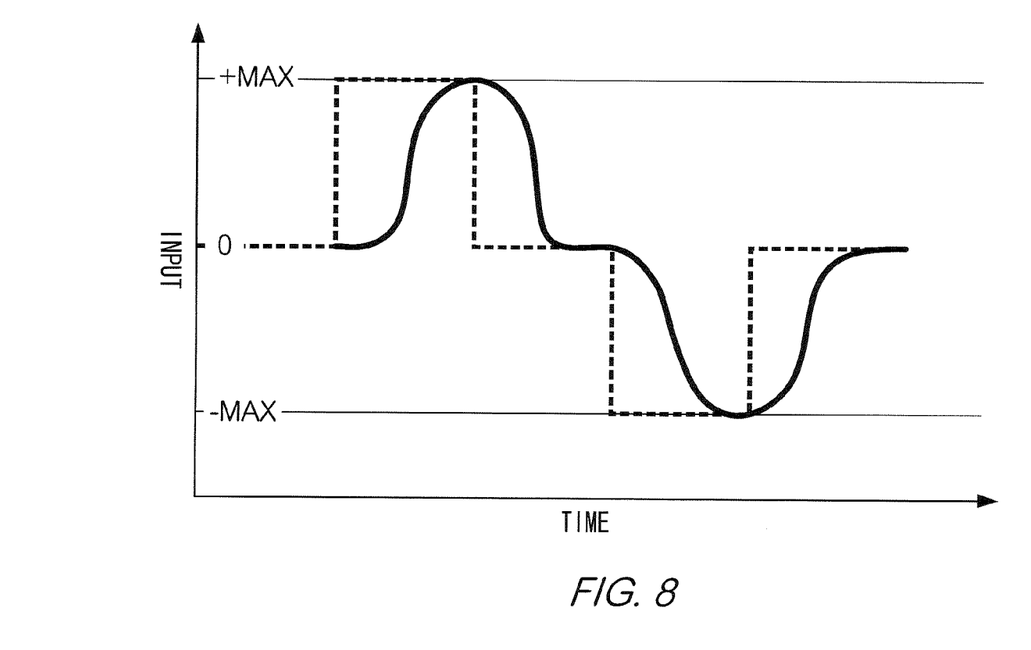
FIG. 8 shows an example of a relationship between an operation input and an input vector.

FIG. 8 illustrates a relationship between an operation input and an input vector. Here, for simplicity, an example will be described in which the input vector is a one-dimensional vector. In FIG. 8, the horizontal axis shows time and the vertical axis shows vector value. Also, a dashed line shows the operation input and a solid line shows the input vector. Here, an example in which a +MAX operation input and a −MAX operation input are alternately performed (i.e., an example in which a rightward operation input and a leftward operation input are alternately performed, for example) is shown. In this example, the input vector tracks the operation input with a slight time delay. The degree of the delay is determined by coefficient k. Note that the method of computing the input vector is not restricted to equation (1). The input vector may be computed by any method that depends on the operation input history.

Referring again to FIG. 6, in step S105, CPU 101 computes the post-movement position of region 53. The current position of region 53 and the input vector are used in computing the post-movement position. More specifically, region 53 moves from the current position in the direction of the input vector by a distance obtained by multiplying the size of the input vector by a predetermined coefficient. The position of region 53 is represented by the position of the point of regard. Note that CPU 101 may restrict the movement of region 53, so that region 53 does not protrude outside of free movement range 54. Once the processing of step S105 ends, CPU 101 shifts the processing to step S108.

In step S106, CPU 101 moves the position of the point of regard of region 53. In this example, CPU 101 first computes a movement range of the point of regard. The movement range is a range showing candidate post-movement positions of the point of regard. The movement range is determined according to the positional relationship between the reference point (e.g., the central point) of virtual space 50 and the point of regard. After determining the movement range, CPU 101 determines what position to move the point of regard to within the movement range.

Figure 9:
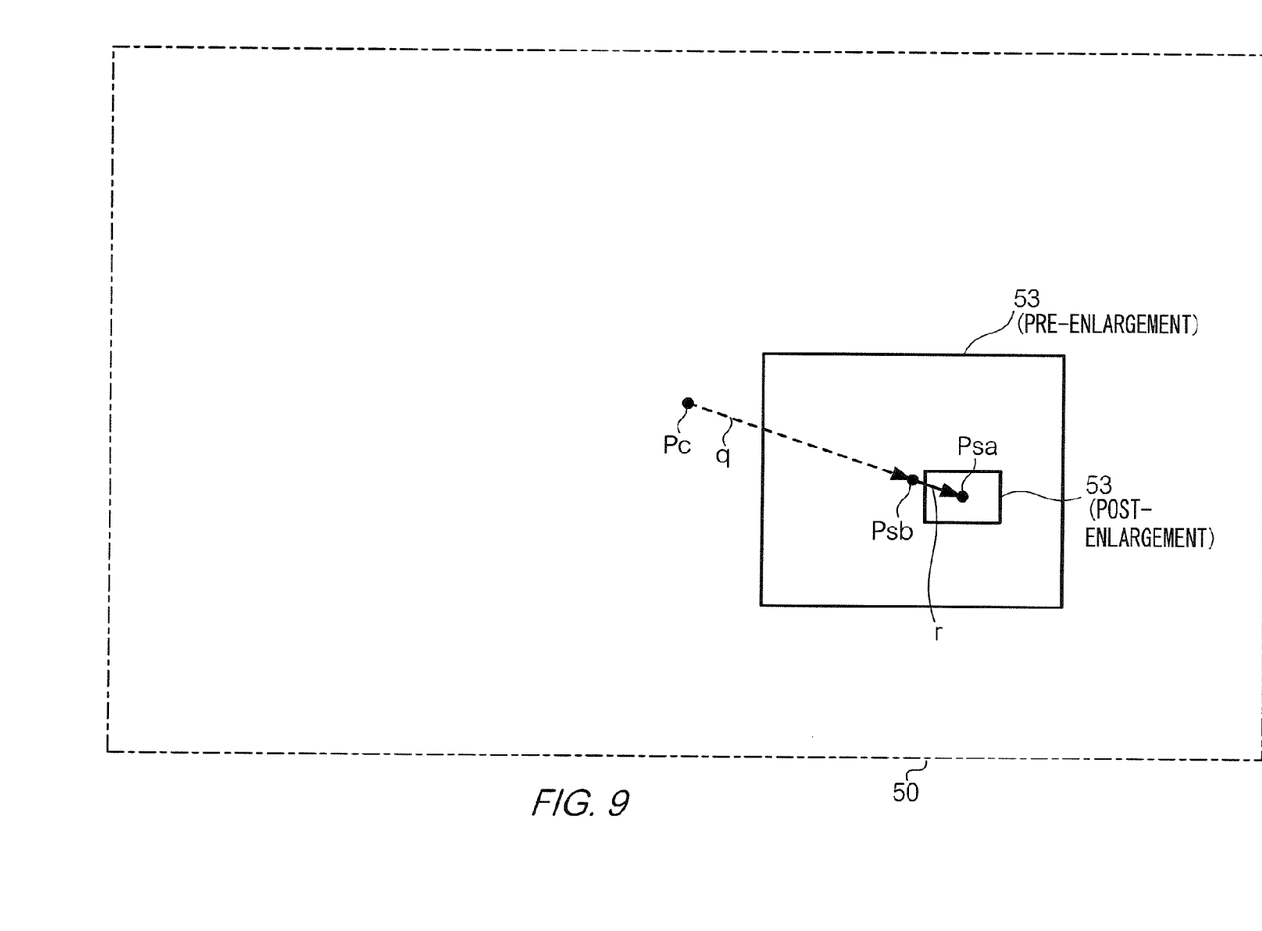
FIG. 9 shows an example of a movement direction of a point of regard.

FIG. 9 illustrates the movement direction of the point of regard. In this example, post-enlargement point of regard Psa has moved in a direction that runs from central point Pc of virtual space 50 toward pre-enlargement point of regard Psb. In other words, vector r from point of regard Psb toward point of regard Psa (vector showing movement of point of regard Ps before and after enlargement) has the same orientation as vector q from reference point Pc toward point of regard Psb.

Figure 10A:
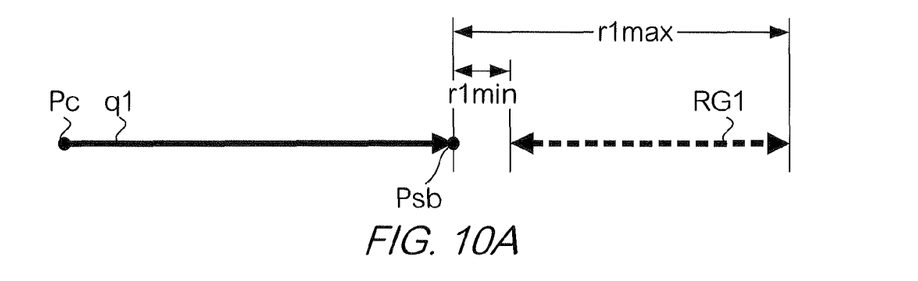
FIGS. 10A-10E show examples of a movement range of the point of regard.
Figure 10B:
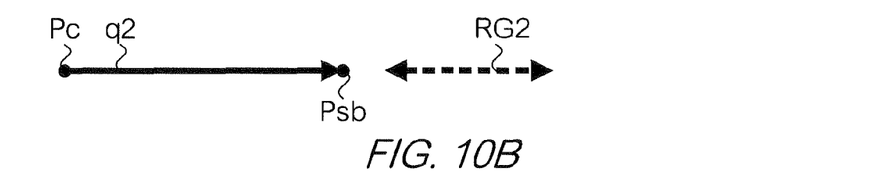
Figure 10C:
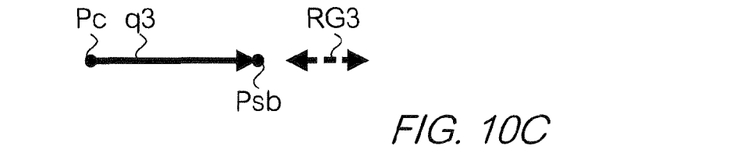

FIGS. 10A-10E illustrate the movement range of the point of regard. Movement range RG of the point of regard is determined according to the distance between reference point Pc and point of regard Psb. Specifically, movement range RG increases as distance from reference point Pc to point of regard Psb lengthens. Also, maximum rmax of the amount of movement increases as distance |q| from the reference point to the point of regard lengthens. Furthermore, minimum rmin of the amount of movement increases as distance |q| from the reference point to the point of regard lengthens. Note that, in FIGS. 10A-10E, maximum rmax and minimum rmin of the movement range are only illustrated for the case where RG=RG1 (r1max and r1min). Also, although rmin>0 in this example, rmin=0 is also possible. In FIGS. 10A to 10C, three examples are shown in which the size of vector q from reference point Pc toward point of regard Psb respectively differ. In these examples, |q1|>|q2|>|q3|, and accordingly RG1>RG2>RG3.

Figure 10D:
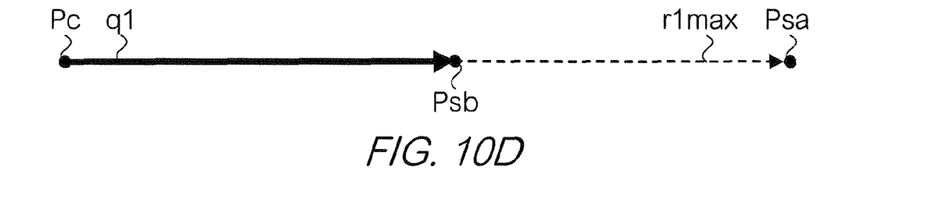
Figure 10E:
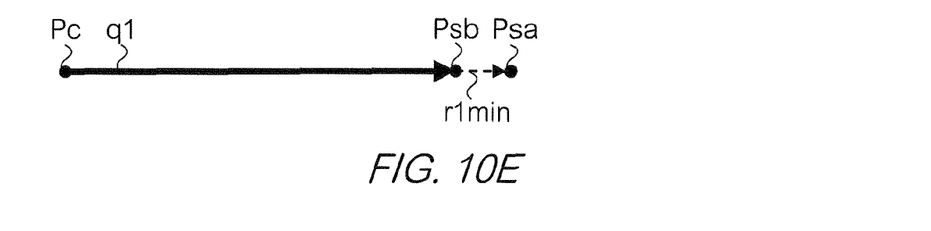

Which position within movement range RG to move the point of regard to is determined according to the relationship between vector q and input vector I. Specifically, in the case where vector q and input vector I are oriented in the same direction, CPU 101 determines the position of the post-movement point of regard so that the movement distance will be at a maximum. FIG. 10D shows the position of point of regard Psa determined so that the movement distance will be at the maximum in the example of FIG. 10A. Also, in the case where vector q and input vector I are oriented in opposite directions, CPU 101 determines the position of point of regard Psa so that the movement distance will be at a minimum. FIG. 10E shows the position of point of regard Psa determined so that the movement distance will be at the minimum in example of FIG. 10A. To be more specific, CPU 101 determines the position of the post-movement point of regard by the following equation (2), for example.

$$rr = (q \cdot I + 1) \times (rmax - rmin)/2 + rmin \qquad (2)$$

Here, rr denotes the movement distance and q·I denotes the inner product of vector q and input vector I. Maximum rmax and minimum rmin are functions of the size of vector q. The specific method of computing maximum rmax and minimum rmin is not particularly limited. Note that the method of determining movement distance rr is not limited to a method using equation (2). For example, the movement distance rr may be determined such that rr=rmax in the case where the inner product of vector q and input vector I is positive and rr=rmin in the case where the inner product of vector q and input vector I is negative.

Referring again to FIG. 6, in step S107, CPU 101 enlarges or reduces region 53, according to the operation input received at step S101. In this example, because the instruction received at step S101 is an instruction to enlarge or reduce the image displayed on touch screen 202, CPU 101 reduces region 53 in the case where enlargement of the image is instructed, and enlarges region 53 in the case where reduction of the image is instructed.

In step S108, CPU 101 displays an image on touch screen 202. Specifically, CPU 101 outputs a signal for drawing an image of region 53 at a position corresponding to the coordinates stored in memory 102 to touch screen 202. Touch screen 202 draws an image according to this signal received via communication module 105 and communication module 203. When the next frame arrives, CPU 101 again executes the processing of steps S101 to S108.

According to the present embodiment as described above, the probability that the desired object will be displayed on the screen after enlargement can be increased, as compared to the case where the point of regard does not change before and after enlargement.

4. Modifications

The technology herein is not limited to the abovementioned embodiment, and various modifications can be implemented. Hereinafter, a number of modifications will be described. Two or more of the following modifications may also be used in combination.

4-1. Modification 1

The orientation of vector r showing the movement of point of regard Ps before and after enlargement is not limited to that described in the embodiment. For example, vector r may have the same orientation as input vector I. Alternatively, vector r may have the same orientation as operation input i of the most recent frame in which an enlargement/reduction instruction was input. Point-of-regard control unit 13 may thus move the point of regard in a direction that depends on the operation input history, regardless of the positional relationship between the reference point in virtual space 50 and the point of regard of region 53. Alternatively, point-of-regard control unit 13 may move the point of regard in a direction that depends on both the positional relationship between the reference point in virtual space 50 and the point of regard of region 53, and the operation input history.

4-2. Modification 2

The reference point of virtual space 50 is not limited to the central point. A point other than the central point, such as the origin of the coordinate axis, an edge point or the like may be used as the reference point. Also, the reference point is not limited to constantly being a fixed point. The reference point may move dynamically according to the situation in virtual space 50. For example, the reference point may move according to the state of the virtual objects, specifically, the number of virtual objects, the distribution of the positions of the virtual objects, the size of the virtual objects, and the like. Alternatively, the reference point may move according to the positional relationship between the virtual objects and the virtual camera.

4-3. Modification 3

The relationship between the operation input and the movement direction of region 53 is not limited to that described in the embodiment. CPU 101 may generate movement speed in the same direction as the direction of the drag or flick.

4-4. Modification 4

In the embodiment, movement of the point of regard was performed both when enlargement of the image is instructed and when reduction of the image is instructed. However, the point of regard need not be moved in the case of reduction of the image.

4-5. Modification 5

The hardware configuration of information-processing device 1 or the other devices is not limited to that described in the embodiment. For example, controller 2 need not have touch screen 202. In this case, controller 2 may have a keypad and/or buttons, and may supply an operation input signal that depends on the key or button that is pressed to information-processing device 1. Alternatively, controller 2 may have an accelerometer, and may supply an operation input signal that depends on measured acceleration (i.e., that depends on the action of the user swinging the controller 2 around) to information-processing device 1.

4-6. Modification 6

The flowchart of information-processing device 1 and the parameters and equations used in various processing are merely illustrative, and the technology herein is not limited to those described in the embodiment. For example, some of the steps in the flowchart of FIG. 6 may be omitted or interchanged in the sequence with other steps.

4-7. Other Modifications

Region 53 is not limited to being a portion of virtual space. Region 53 may be part of real space.

Information-processing device 1 is not limited to being a console-type game device. Information-processing device 1 may be an information-processing device other than a game device, such as a portable game device, a personal computer, a mobile phone, a PDA (Personal Digital Assistant) or a tablet device. Also, application programs executed in information-processing device 1 are not limited to game applications. An application program for realizing a function other than a game, such as a text editing application, a learning application, and other practical software, may be executed in information-processing device 1. Also, a server device on a network may have some of the functions of information-processing device 1 described in the embodiment. In this case, an information-processing system having the server device and information-processing device 1 has the functions described in the embodiment. Furthermore, some of the functions of information-processing device 1 described in the embodiment may be omitted.

Application programs that are executed by information-processing device 1 are not limited to those provided by storage media. Application programs may be provided by download via a network such as the Internet. Also, the system software of information-processing device 1 may be provided by storage media or download.

What is claimed is:

1. An information-processing device comprising at least one processor, the information-processing device configured to:
   receive an enlargement/reduction instruction to enlarge or reduce a display region that is at least a portion of a predetermined region;
   receive a movement instruction to move the display region;
   responsive to the enlargement/reduction instruction of the display region, compute, based on a relationship between a center of the display region, within the predetermined region, before the enlargement or reduction, and a center of the predetermined region, a position where the center of the display region is to be located within the predetermined region after the enlargement or reduction, the predetermined region being identical before and after the enlargement or reduction;
   enlarge or reduce the display region based on the enlargement/reduction instruction; and
   at a time of the enlargement or reduction, move the center of the display region from the center of the display region toward a direction from the center of the predetermined area to the center of the display region before the enlargement or reduction.

2. The information-processing device according to claim 1, wherein
   at a time of the enlargement or reduction, the center of the display region is moved in a direction toward a position where the center of the display region is located within the predetermined region prior to the enlargement or reduction with respect to the center of the predetermined region.

3. The information-processing device according to claim 1, wherein
   an amount of change of the center of the display region is increased as a distance from the center of the predetermined region to the center of the display region, within the predetermined regions, increases.

4. The information-processing device according to claim 1, further configured to:
   move and/or enlarge or reduce the display region, based on the enlargement/reduction instruction and the movement instruction.

5. The information-processing device according to claim 1, further configured to:
   determine an amount of movement in a direction toward a position where the center of the display region is located within the predetermined region prior to the enlargement or reduction with respect to the center of the predetermined region, according to an accumulation of the movement instructions for a given past period.

6. The information-processing device according to claim 5, further configured to:
   determine the amount of movement in the direction toward the position where the center of the display region is located within the predetermined region prior to the enlargement or reduction with respect to the center of the predetermined region, according to a vector determined based on the movement instructions for the given past period.

7. The information-processing device according to claim 6, further configured to:
   determine the amount of movement such that the amount of movement is less when an orientation of the vector and an orientation from the center of the predetermined region toward the center of the display region within the predetermined region are opposite than when an orientation of the vector and an orientation from the center of the predetermined region toward the center of the display region within the predetermined region are the same.

8. The information-processing device according to claim 1, further configured to:
   move the center of the display region within the predetermined region in a direction determined according to an accumulation of the movement instructions for a given past period.

9. The information-processing device according to claim 1, wherein the display region is shifted to correspond to the center of the display region when the center of the display region moves after the enlargement or reduction.

10. The information-processing device according to claim 1, wherein the center of the display region after the enlargement or reduction is determined based on the center of the display region before the enlargement or reduction and the center of the predetermined region.

11. The information-processing device according to claim 1, wherein the process of computing the center of the display region after the enlargement or reduction is triggered upon receipt of the enlargement/reduction instruction.

12. A non-transitory computer-readable storage medium storing a program causing a computer device to execute a process, the process comprising:
   receiving an enlargement/reduction instruction to enlarge or reduce a display region that is at least a portion of a predetermined region;
   receiving a movement instruction to move the display region;
   responsive to the enlargement/reduction instruction of the display region, computing, based on a relationship between a center of the display region, within the predetermined region, before the enlargement or reduction, and a center of the predetermined region, a position where the center of the display region is to be located within the predetermined region after the enlargement or reduction, the predetermined region being identical before and after the enlargement or reduction;
   enlarging or reducing the display region based on the enlargement/reduction instruction; and
   at a time of the enlargement or reduction, moving the center of the display region from the center of the display region toward a direction from the center of the predetermined area to the center of the display region before the enlargement or reduction.

13. An information-processing method implemented using an information processing system having at least one processor, the method comprising:

receiving an enlargement/reduction instruction to enlarge or reduce a display region that is at least a portion of a predetermined region;

receiving a movement instruction to move the display region;

responsive to the enlargement/reduction instruction of the display region, computing, using the at least one processor and based on a relationship between a center of the display region, within the predetermined region, before the enlargement or reduction, and a center of the predetermined region, a position where the center of the display region is to be located within the predetermined region after the enlargement or reduction, the predetermined region being identical before and after the enlargement or reduction;

enlarging or reducing the display region based on the enlargement/reduction instruction; and at a time of the enlargement or reduction, moving the center of the display region from the center of the display region toward a direction from the center of the predetermined area to the center of the display region before the enlargement or reduction.

14. An information-processing system comprising:

a processing system having at least one processor, the processing system configured to:

receive an enlargement/reduction instruction to enlarge or reduce a display region that is at least a portion of a predetermined region;

receive a movement instruction to move the display region;

responsive to the enlargement/reduction instruction of the display region, compute, based on a relationship between a center of the display region, within the predetermined region, before the enlargement or reduction, and a center of the predetermined region, a position where the center of the display region is to be located within the predetermined region after the enlargement or reduction, the predetermined region being identical before and after the enlargement or reduction;

enlarge or reduce the display region based on the enlargement/reduction instruction; and at a time of the enlargement or reduction, move the center of the display region from the center of the display region toward a direction from the center of the predetermined area to the center of the display region before the enlargement or reduction.

15. An information-processing device comprising at least one processor, the information-processing device configured to:

receive an enlargement/reduction instruction to enlarge or reduce a display region that is at least a portion of a predetermined region;

responsive to the enlargement/reduction instruction of the display region, compute, based on a relationship between a center of the display region, within the predetermined region, before the enlargement or reduction, and a center of the predetermined region, a position where the center of the display region is to be located within the predetermined region after the enlargement or reduction, the predetermined region being identical before and after the enlargement or reduction;

enlarge or reduce the display region based on the enlargement/reduction instruction; and at a time of the enlargement or reduction, move the center of the display region from the center of the display region toward a direction from the center of the predetermined area to the center of the display region before the enlargement or reduction, and keeping at least a portion of the desired object within the display region after the enlargement or reduction.

16. An information-processing device comprising at least one processor, the information-processing device configured to:

receive an enlargement/reduction instruction to enlarge or reduce a display region that is at least a portion of a predetermined region, while the display region is displayed;

responsive to the enlargement/reduction instruction of the display region, compute a position where a center of the display region is to be located after the enlargement or reduction so that a direction from a center of the display region before the enlargement/reduction toward the center of the display region after the enlargement/reduction is directed to move away from a center of the predetermined region, the predetermined region being identical before and after the enlargement or reduction;

enlarge or reduce the display region based on the enlargement/reduction instruction; and at a time of the enlargement or reduction, move the center of the display region from the center of the display region toward a direction from the center of the predetermined region to the center of the display region before the enlargement or reduction.

* * * * *